United States Patent
Golden et al.

(10) Patent No.: US 7,147,423 B2
(45) Date of Patent: Dec. 12, 2006

(54) MATERIAL EJECTION SYSTEM FOR A VEHICLE

(75) Inventors: Randy Golden, Highways 13 and 20 Junction, Plainview, NE (US) 68769; Fred P. Smith, Alpine, UT (US); Daniel Payne, Herriman, UT (US)

(73) Assignee: Randy Golden, Plainview, NE (US)

( * ) Notice: Subject to any disclaimer, the term of this patent is extended or adjusted under 35 U.S.C. 154(b) by 251 days.

(21) Appl. No.: 10/891,402

(22) Filed: Jul. 14, 2004

(65) Prior Publication Data

US 2006/0045702 A1    Mar. 2, 2006

(51) Int. Cl.
 *B60P 1/00*   (2006.01)
 *B65F 3/28*   (2006.01)

(52) U.S. Cl. ............ 414/510; 414/514; 414/516; 414/521; 298/1 B

(58) Field of Classification Search ........ 414/506–507, 414/509, 510, 514–516, 521, 527; 298/1 B; 198/750.1, 750.7
See application file for complete search history.

(56) References Cited

U.S. PATENT DOCUMENTS

| | | | | |
|---|---|---|---|---|
| 2,218,121 A | * | 10/1940 | Paiement | 414/513 |
| 2,298,982 A | * | 10/1942 | Smith | 414/513 |
| 2,318,886 A | * | 5/1943 | Paiement | 414/516 |
| 2,523,916 A | * | 9/1950 | Paiement | 414/516 |
| 2,909,295 A | * | 10/1959 | Weir | 414/515 |
| 3,021,968 A | * | 2/1962 | Myers | 414/513 |
| 3,498,482 A | * | 3/1970 | Milburn | 414/510 |
| 3,722,717 A | * | 3/1973 | Stryczek | 414/521 |
| 3,888,366 A | * | 6/1975 | Prahst | 414/527 |
| 3,904,049 A | * | 9/1975 | Prahst | 414/527 |
| 4,002,272 A | * | 1/1977 | Crawford et al. | 222/392 |
| 4,162,735 A | * | 7/1979 | Lewis | 414/514 |
| 4,842,471 A | * | 6/1989 | Hodgetts | 414/515 |
| 4,927,316 A | * | 5/1990 | Kordel | 414/510 |
| 5,314,290 A | * | 5/1994 | Lutz et al. | 414/509 |
| 6,079,933 A | * | 6/2000 | Moyna et al. | 414/517 |
| 6,129,500 A | * | 10/2000 | Doyon | 414/528 |
| 6,837,668 B1 | * | 1/2005 | Brown | 414/521 |

* cited by examiner

*Primary Examiner*—James W. Keenan
*Assistant Examiner*—Charles Greenhut
(74) *Attorney, Agent, or Firm*—Adam H. Jacobs

(57) ABSTRACT

In combination, a vehicle including a body having a floor and generally upright walls and a material ejection system for the vehicle including a generally flexible floor mounted adjacent to and generally covering the floor of the vehicle when in extended position. A flexible floor drive roller is rotatably mounted generally adjacent the rearward end of the vehicle and is connected to the flexible floor drive roller and a drive device such as an hydraulic cylinder is operatively connected to the flexible floor drive roller for rotating the flexible floor drive roller to wrap the flexible floor on the flexible floor drive roller. Finally, the operative connection between the drive means and the flexible floor drive roller includes at least one flexible member in tension which transfers torque to the flexible floor drive roller for rotating the flexible floor drive roller to wrap the flexible floor thereon.

10 Claims, 11 Drawing Sheets

MATERIAL EJECTION SYSTEM FOR A VEHICLE

BACKGROUND OF THE INVENTION

1. Technical Field

This invention relates to bulk trailers and more particularly to a system for removing a load out of the back of the trailer by wrapping a flexible floor around a powered drum at the discharge end of the trailer; the moving flexible floor pulls an ejector panel from the front of the trailer to the rear of the trailer; and where the efficiency of the discharge system is increased by closely matching the input power to the power required to move the load.

2. Description of the Prior Art

Bulk materials have been and continue to be transported by open-top transport semi-trailers. These trailers fit into several categories primarily based on the method of removing the load from the trailer body. There are several factors that determine how profitable a particular type of trailer will be in a particular operation. In general, truckers get paid for moving material from point A to point B; the more they can haul and the less time it takes them to haul it, that the more profitable their operation will be.

Since most localities legislate the maximum allowable vehicle weight, the weight of the truck and trailer become very important. Every pound of truck or trailer weight reduces the maximum payload by a pound. Another important factor is the speed with which the payload can be deposited at a job site. This is particularly important on short hauls where the turnaround time (the time it takes to get from the load site, to the dump site and back to the load site) may be 15 minutes or less. All things being equal, if the trucker can save one minute when depositing the load on a 15 minute turnaround time, two additional runs can be made in a single 8 hour day. This significantly increases the profitability of the trucking operation.

Another important part of the profitability picture in transporting materials is the availability (the amount of time the trailer is actually available for use, and not in the shop for repair) of the trailer. The availability of the trailer is commonly affected by its complexity. In general, the more parts there are, the more things there are to go wrong and the more often the trailer will be in the shop for repair.

Further, the initial cost of the trailer is a factor in the overall profitability of the trucking operation, as that initial cost must be amortized over a number of years and paid for out of profits made from hauling material.

Safety is also another issue that must always be considered. One of the biggest problems with long dump style trailers is stability when dumping. Tipping a trailer over because of unstable ground, sticking loads, and driver error are typical. Another problem is sealing the trailer so that the material they contain does not slip out onto the roadway. Most everybody has dealt with the rock chips in their windshields that this causes or worse. Therefore, it is very important to be able to seal the tailgate and other areas of the trailer where material could leak out.

The prior art falls into several types. The first is what is commonly referred to as walking floor® or shuffle floor unloading. These trailers eject the load by means of moving floor slats, typically made out of aluminum extrusions, steel, or even composites. These slats are grouped in sets of three across the floor. In other words, if there are 21 slats to make up the floor, slats 1, 4, 7, etc. belong to group one. Slats 2,5,8, etc. belong to group 2. Slats 3,6,9, etc. belong to group 3. Each of the groups of slats is connected to a hydraulic cylinder. To eject the load, all the slats are pushed out a certain distance, for example two feet. This moves the whole load rearward 2 feet. Then group 1 slats are retracted. Since, group 2 and 3 slats did not move, there is more friction holding the load from moving than group 1 slats generate when they slide back and the load stays put. Likewise, group 2 slats are pulled back while groups 1 and 3 are stationary. Likewise, group 3 slats are pulled back while group 1 and 2 slats are held stationary. Then the process is repeated. Shuffle floors have the disadvantage of being very heavy as there is, effectively, a double floor, the floor that supports the slats and the slats themselves. The shuffle floor is also quite slow. It is typical for such a floor to take 8 to 10 minutes to remove a load from a 48-foot trailer body. Maintenance can also be a problem, as there are a substantial number of moving parts. Even though there have been great strides in sealing the moving slats, material getting under the slats can still be a problem. Yet another problem was walking floor type trailers is that with particulate materials it is virtually impossible to completely clean out the trailer. Also, there are some materials, such as biosolids, that simply cannot be moved by this method. Shuffle floors also make inefficient use of the power available to them in that the floors operate at the same speed and have the same force available for moving the load when the trailer is full or empty.

Another method used to remove a load from a trailer is simply dumping. This method consists of having a hydraulic cylinder that either pushes the bed up directly, or operates a linkage that pushes the bed up. The most apparent problems with this type of trailer is that the center of gravity gets very high and can cause the trailer to tip over easily, especially if the ground is not flat or is unstable. Another problem is that loads can stick, and gravity is the only force trying to extricate the load from the trailer. If the load sticks, tipping the trailer over is much more likely. Also, many times granular loads need to be spread evenly on the ground, instead of just stockpiled. Again, the high center of gravity, when the trailer is up in the air, makes the possibility of tipping the trailer over while spreading a much larger problem.

Side dump trailers are similar to the trailer just explained, except that the body is dumped over to the side, instead of straight back. Many of the same stability problems are issues with side dump trailers. Further, because of the way side dump trailers must be designed, capacity is often an issue. Also, side dump trailers have difficulty spreading a granular load directly behind the trailer.

Yet another method used to remove the load from the trailer, utilizes a continuous conveyor belt. With different loads on the conveyor belt, it is sometimes difficult to keep the belt tracking correctly. Also, the belt must be continuous, and therefore must be spliced together by lacing, vulcanizing, or by some other means. This method of unloading has required a very expensive planetary drive that drives one of the rollers. Tensioning of the belt is a continuous problem, as the drive system depends on friction of the belt on the roller. This method is a very inefficient way to unload the trailer. Maximum torque is required when the trailer is full and the planetary drive has to be designed to generate enough torque to get the load moving. Yet, when the trailer is almost empty, the belt requires very little torque to move it, yet full torque is still available from the planetary drive. This can be mitigated to some extent by multi-speed gearboxes, but they increase the cost substantially. This also causes severe difficulty in trying to seal of the trailer. The top of the conveyor belt loop must be supported by the trailer floor and bottom of the conveyor belt typically runs under the floor. The belt must therefore enter and leave the volume contained by the trailer. All of the entrances and exits must all be sealed. A typical conveyor belt trailer may take two and a half to three minutes to eject a typical 48 ft. long trailer.

A flapper trailer is very similar to the continuous belt trailer just described, except that instead of a continuous conveyor belt, two chains and lateral rubber flaps are used. Maintenance costs are high. The flaps do not move the entire load all once, and therefore they are very inefficient. Like the conveyor belt method, full torque is always available even when it is not required. Another big problem with this type of trailer are the spaces for material to get trapped. The chains ride on top of a solid floor; the multiple rubber flaps effectively make any secondary floor above the solid floor. This space in between the two floors can end up being a repository for material that has been hauled. This is particularly a problem one first hauling on material such as gravel and later a material such as grain. If gravel has worked its way into this repository, then it has the possibility of contaminating the grain on future loads. Another difficulty with this type of trailer is that as the flaps, chains, and crossmembers the flaps are attached to come out of the load, and they can hold some of the material on them. This material is now able to fall off of these members, as they are now below the trailer floor, as the trailer moves down the highway.

Another type of trailer utilizes an ejector panel at the front of the trailer that is moved by a large telescopic cylinder. The cylinder required to eject a 48-foot long trailer is quite substantial and many times requires vertical supports simply to support the weight of the cylinder. Further, the force of the cylinder must overcome the friction of the material, due to its weight, on the floor and walls of the trailer. The force to eject the load may also increase the friction load as the pressure on the ejector panel increases the pressure of the material against the floor and sidewalls.

Another type of ejecting system is found in UK patent application 2351063. This patent application describes a trailer that utilizes a flexible floor that is attached at one end to a headboard and to a winch drum at the other end. The winch drum is rotated by means of a hydraulically operated planetary reducer mounted inside the drum. A sheave is mounted to the other side of the drum and wrapped with a cable. The cable goes through a compensating system, back up to the front of the trailer, around the sheave, and attaches to the headboard. To remove the load from the trailer, the winch drum is rotated, wrapping the flexible floor around the winch drum, which pulls the flexible floor and headboard toward the rear, dumping the material onto the ground. As the flexible floor is wound up onto the winch drum, cable is played out from the sheave that is mounted to the side of the drum. As the flexible floor winds up onto the drum, the radius of the drum changes. As the cable is played out from the sheave, the radius changes. Thus, the rate at which the flexible floor is wound onto the winch drum and in the rate the cable is played out are constantly changing. This requires a compensating system on the cable to make up for the differences. The planetary reducer required by the system is very expensive and is also very large, requiring a large winch drum. Further, the maximum torque required to get the belt moving when the trailer is full is still available to move the belt when the trailer is nearing empty. This is a very inefficient use of the power available. As previously explained, the drum gets larger as the flexible floor wraps up on the drum. The flexible floor is then pulled up off its supporting floor near the drum, allowing material to get under the flexible floor. Also, the tailgate cannot close until the entire flexible floor is unwound off of the drum. Further, it is very difficult to seal the drum by the tailgate. Whatever is used to seal the drum by the tailgate must compensate for the changing drum diameter or a gap must be left to allow for the change in diameter. Further, the cable length compensating system requires additional hydraulic and mechanical components to accomplish the return of the flexible floor and headboard to their original position. Further, this return is accomplished by the same motor that produces enough torque to move the load out, even though all it is doing is moving the headboard and unloaded flexible floor back into position. This is very inefficient and takes considerable time. Space considerations that allow the system of UK patent application 2351063 to be used on off-road vehicles may very well limit its application to over-the-road vehicles.

The foregoing challenges and design considerations, as well as others, are addressed by the present invention.

SUMMARY OF THE INVENTION

Consistent with the foregoing objects, and in accordance with the invention as embodied and broadly described herein, an apparatus is disclosed in one embodiment of the present invention as including a trailer with a system for removing a load out of the trailer. The trailer having a longitudinal direction (aligned with the length of the trailer), lateral direction (widthwise across the trailer), and transverse direction (perpendicular to the ground).

The present invention utilizes a high strength (100,000+ psi yield) steel floor, high strength (100,000+ psi yield) steel support beams that run longitudinally with pultruded composite walls. The top of the body is open. The composite sidewalls are connected to each other with roof bows approximately every 10 ft. in the longitudinal direction with adjoining body bolsters. A cross-section through the trailer shows the composite sidewalls, body bolsters and roof bows to have the same arc, such that the top of the trailer appears circular.

Inside the trailer there is an ejector panel that is fastened to a conveyor belt material that longitudinally covers the floor. The other end of the conveyor belt passes around an idler roller and then is removably connected to a drive roller. Attached to each end of the drive roller are drive cable sheaves. A drive cable is fastened to each of the drive cable sheaves and then is routed around other sheaves and a telescopic cylinder before being removably connected to the trailer frame. The drive cable is routed in such a way so that the ratio of cable movement to telescopic cylinder movement is 4 to 1. Therefore, the tangential velocity of the drive cable sheave is 4 times that of the cylinder extension.

The rear of the trailer is closed off by a tailgate. The tailgate is pivoted about a pivot point by means of a cylinder. The pivots are located high on the rear roof bow. Pivoting the tailgate in this location raises the tailgate high enough that draft arms (arms extending forward from the tailgate with a pivot at the front thereof) are not required. The tailgate is held firmly in the closed position by two hooks actuated by actuators 22.

Located at the front of the trailer is a small winch. From the small winch there is a cable that connects to the ejector panel. The function of this winch is to pull the ejector panel and conveyor belt material back to the front of the trailer once the unloading of the material in the trailer has taken place. As the conveyor belt material moves forward, the drive cables are wound onto the drive cable sheaves.

With the ejector panel moved to the front of the trailer and the tailgate latched closed, the trailer is ready to receive a load. The trailer is loaded through the top and is contained by the belt on the floor, the sidewalls, the ejector panel and the tailgate. After loading, as readily known in the art, the load may be fully contained by rolling a tarp attached at the top of one sidewall, over the roof bows and then securing the tarp to the other sidewall. The round roof bows assure that the tarp will roll up over the load without damage. The trailer is then attached to a hydraulic power source that is generally on the tractor that pulls the trailer. The trailer is then pulled to the site where it is to be offloaded. At the offload site, the operator unlocks the hooks that hold the tailgate closed. This may be accomplished via a switch in the cab that shifts an air valve. The air valve, in turn, provides air to an actuator that moves a hook that unlatches the tailgate. The operator then actuates a switch that similarly provides air to the cylinders that raise the tailgate. Alternatively, the gate may be manual and pushed open by the material being ejected. The operator then shifts a valve that provides hydraulic fluid and pressure to the telescopic cylinder. The cylinder extends in a longitudinal direction, pushing the sheave attached to its rod end toward the front of the trailer. As the cylinder extends, cable is pulled off of the sheaves at each end of the drive roller. The cable is pulled off at a rate of four times the cylinder extension rate and consequently with a force of one quarter of the cylinder force. It will be readily apparent to one skilled in the art that other cable routings could provide other ratios of cylinder force to cable force that would also work well. The cable generates a torque on the drive roller to wind up the floor belting onto the drive roller. As the belting winds onto the drive roller, the belting and ejector panel are pulled along the top of the floor and material that was on top of the belting is deposited onto the ground.

As the belt and ejector panel are pulled towards the rear, cable is played off of the winch at the front of the trailer. This is accomplished by having the winch hydraulically freewheel. When the ejector panel reaches the rear of the trailer, the load has been completely removed. To return the panel to its front position in the trailer, the small winch at the front of the trailer is engaged. As the ejector panel is dragged forward, the belt plays off of the drive roller. This, in turn, winds the cables onto each sheave attached to the ends of the drive roller. As the cable is wound up, the telescopic cylinder is forced to retract and oil from the base end returns to the tank through the valve. This continues until the ejector panel and floor belt are completely returned to their initial position. At this point the operator actuates the air switch to lower the tailgate and then actuates the air switch to lock the tailgate and position.

In prior art designs that utilized a flexible belt or chains with flap belting on the floor, the drive system consisted of a hydraulic motor with a gear reducer that turned a roller or sprockets at the rear of the trailer. This type of drive system is very expensive. Also, the available torque, for this type of system, throughout the entire ejection process is maximum and constant. The required torque of the present invention, on the other hand, is constantly decreasing as the load is expelled from the back of the trailer. The belt force is a function of the weight on the belt times the coefficient of friction of the belt on the floor. Thus, as the weight is expelled, the force on the belt decreases and the required torque decreases. Having extra torque available is inefficient and the present invention reduces this inefficiency as will more fully be described later.

Large inefficiencies in the prior art in the use of available power for the return cycle are even more apparent. The same motor/reducer is used in reverse, on some of the prior art, in order to move the belt and front panel forward. Thus, huge torques are available, yet very little torque is required to move the panel and empty belt back into its original position. Again, this is an extremely inefficient use of the power available. These inefficiencies manifest themselves in one of two ways. First, the time to eject the load is increased and/or second, the GPM or pressure of the hydraulic system must be higher.

The present invention has overcome this problem by closely matching the available torque to the required torque, using several techniques simultaneously accomplishes this. First, as the belt is wrapped on to the drive roller, the diameter of the drive roller increases reducing the required force on the belt and increasing the speed of ejection, as the load is ejected. Second, because the cable is stacked on top of itself in the sheaves attached to the drive roller, as cable is played out, the diameter of the cable in the sheave decreases. This reduces the available torque and increases the speed as the cable is played out. Thirdly, the use of a multistage cylinder decreases the force on the cable as each smaller cylinder stage engages. This also increases the speed of ejection.

The present invention also overcomes the problem on the return stroke. The force to return the ejector panel to the front of the trailer and unreel of the belt from off of the drive roller requires an essentially constant force. This force is considerably smaller than the force required to eject the load. The small winch at the front of the trailer of the present invention produces this constant force. Thus, the return stroke can be very quick indeed.

Another problem with prior art designs is being able to completely sealed the tailgate area, particularly on systems where the belt is wound up onto a drum. Whatever is used to seal the drum by the tailgate must compensate for the changing drum diameter or a gap must be left to allow for the change in diameter. The present invention overcomes this deficiency by wrapping the belt around a small idler roller at the rear of the trailer before being wound on to the drive roller. Because the diameter of the belt going around the idler roller does not change, it is a simple matter to have the tailgate sealed directly on the belt going over the idler roller. There also can be a nice tight fit between the trailer body and the top of the belt as the belt goes over the idler roller.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DESCRIPTION OF THE PREFERRED EMBODIMENT

It will be readily understood that the components of the present invention, as generally described and illustrated in the Figures herein, could be arranged and designed in a wide variety of different configurations. Thus, the following more detailed description of the embodiments of the system (and method) of the present invention, as represented in FIGS. 1 through 10, is not intended to limit the scope of the invention, as claimed, but is merely representative of certain embodiments of apparatus (and methods) in accordance with the invention.

The embodiments of systems in accordance with the invention will be best understood by reference to the drawings, wherein like parts are designated by a like numerals throughout. Those of ordinary skill in the art will, of course, appreciate and that various modifications may easily be made without departing from the basic characteristics of the invention.

Figure 1:
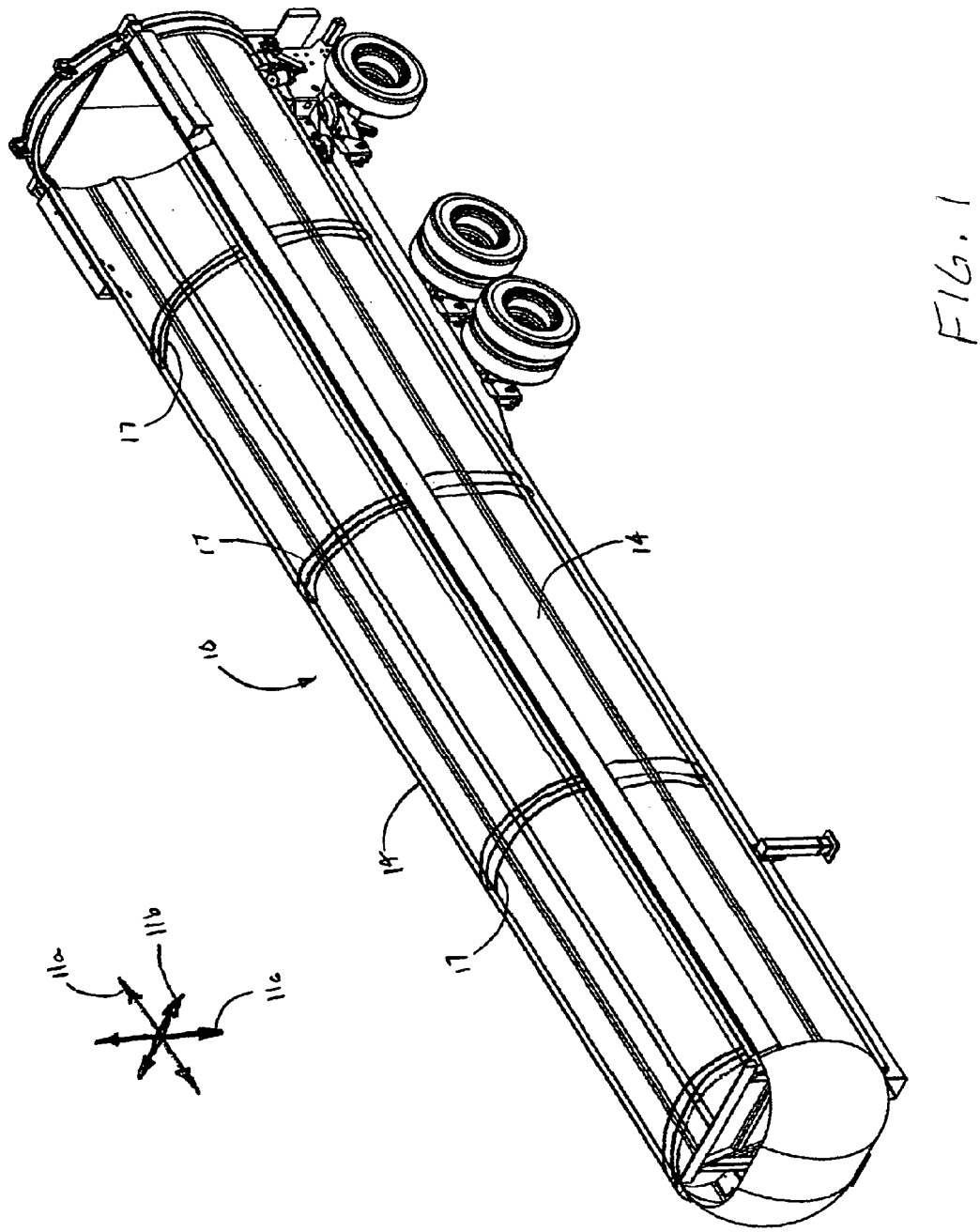
FIG. 1 is an isometric view of the trailer.
Figure 2:
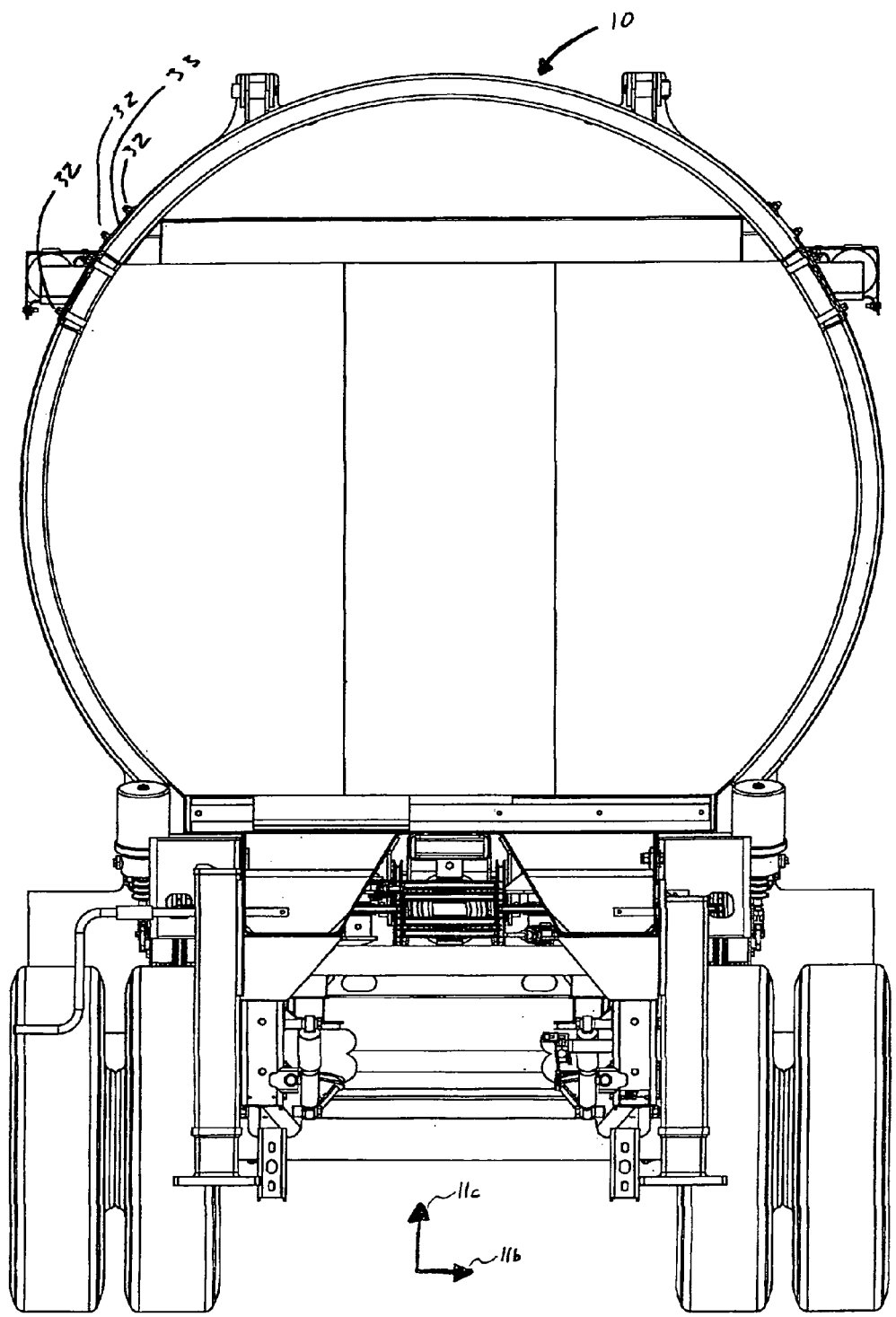
FIG. 2 is a front view of the trailer.

Referring to FIGS. 1 and 2, in describing an ejecting trailer 10 in accordance with the present invention, it may be advantageous to first define longitudinal 11a, lateral 11b, and transverse 11c directions positioned to be substantially mutually orthogonal. In general, the longitudinal direction 11a will be aligned with the length of the trailer. The lateral direction 11b will extend from side to side. By default, the transverse direction 11c will then be aligned with a direction close to vertical. All directions are with respect to the ejecting trailer 10.

Figure 3:
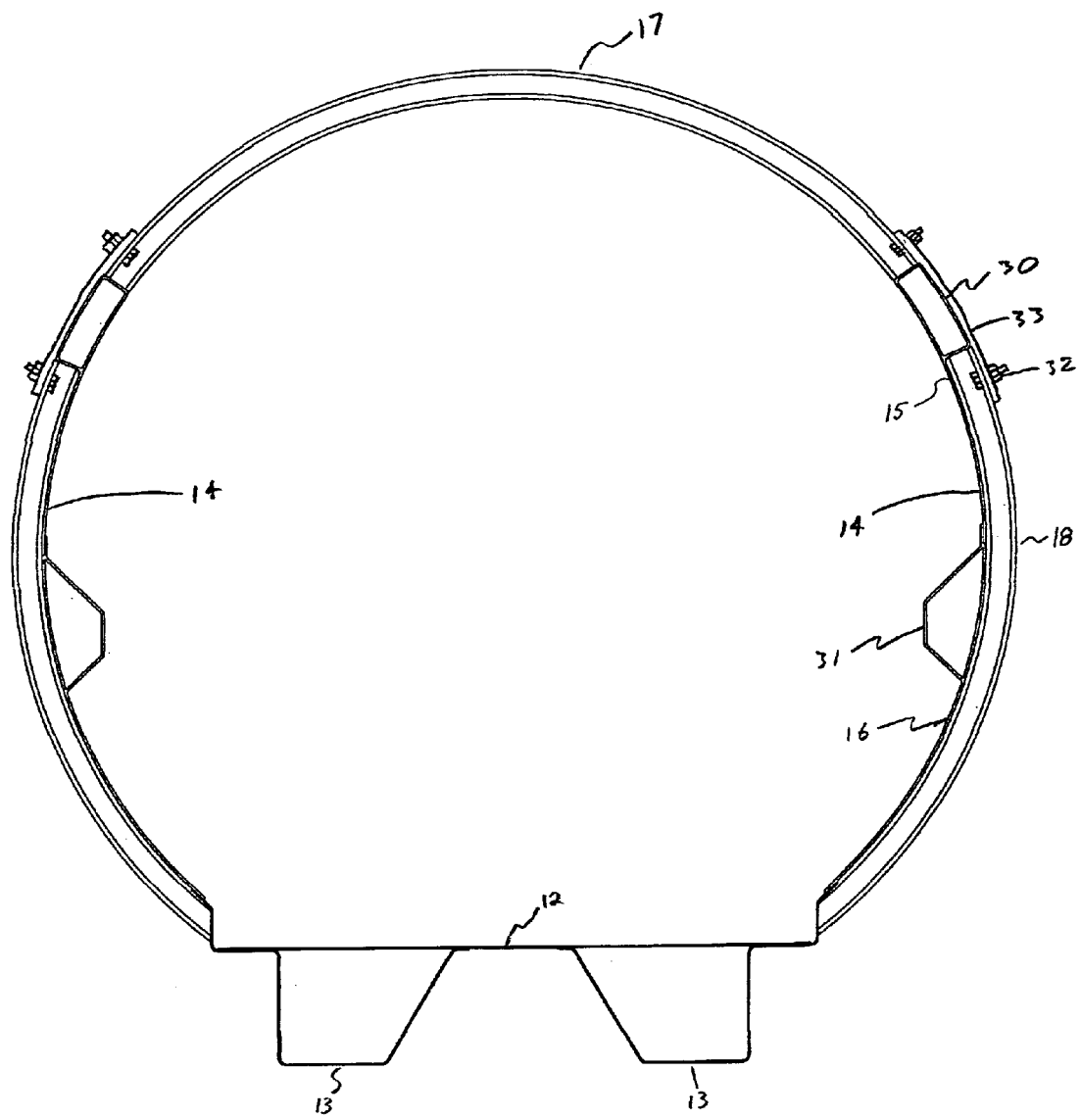
FIG. 3 is a cross-sectional view showing the floor, beams under the floor, sidewalls, body bolsters and roof bows.

The structures on the ejecting trailer 10 typically accomplish three basic functions. The first function is containing a load. The second function is transporting a load. The third function is removing the load. An ejecting trailer 10 in accordance with the present invention may be divided into componentry according to these three functions. For example, referring to FIG. 3, the load is contained on the bottom by a high strength steel floor 12, high strength steel support beams 13 that run longitudinally the length of the trailer. This material may be a high strength steel such as Domex®. The walls 14 of the trailer body may be of a pultruded fiberglass composite and are generally arcuate in shape. The walls 14 may each be formed of top pultrusion 15 and a bottom pultrusion 16. The top pultrusion 15 has a rectangular structural beam at the top. Approximately halfway up the wall 14 in the transverse direction 11c is a structural beam formed by a channel 31 in the bottom pultrusion 16 and a straight portion of the top pultrusion 15. Mechanical fasteners and/or an adhesive such as urethane may fasten the two pultrusions. The lower pultrusion 16 of the wall can be mechanically fastened to the steel floor 12 and/or bonded with an adhesive such as urethane. The top of the body is open. The composite sidewalls are connected to each other with roof bows 17 approximately every 10 ft. in the longitudinal direction 11a. The composite sidewalls 14 are further supported by body bolsters 18 on the exterior side of the sidewalls 14 at about the same location as the roof bows 17, approximately every 10 ft. in the longitudinal direction 11a. The body bolsters 18 are connected to the support beams 13 by fasteners or welding or by intermediate plates. The composite sidewalls 14 are connected to the body bolsters 18 by mechanical fasteners and/or by an adhesive such as urethane. As shown in FIG. 2, the body bolsters 18 are also connected to the roof bows 17 by means of mechanical fasteners 32 and plates 33. FIG. 3, a cross-section through the trailer, shows the composite sidewalls 14, body bolsters 18 and roof bows 17 to have the same arc, such that the trailer 10 appears circular as shown in FIG. 3.

Figure 4:
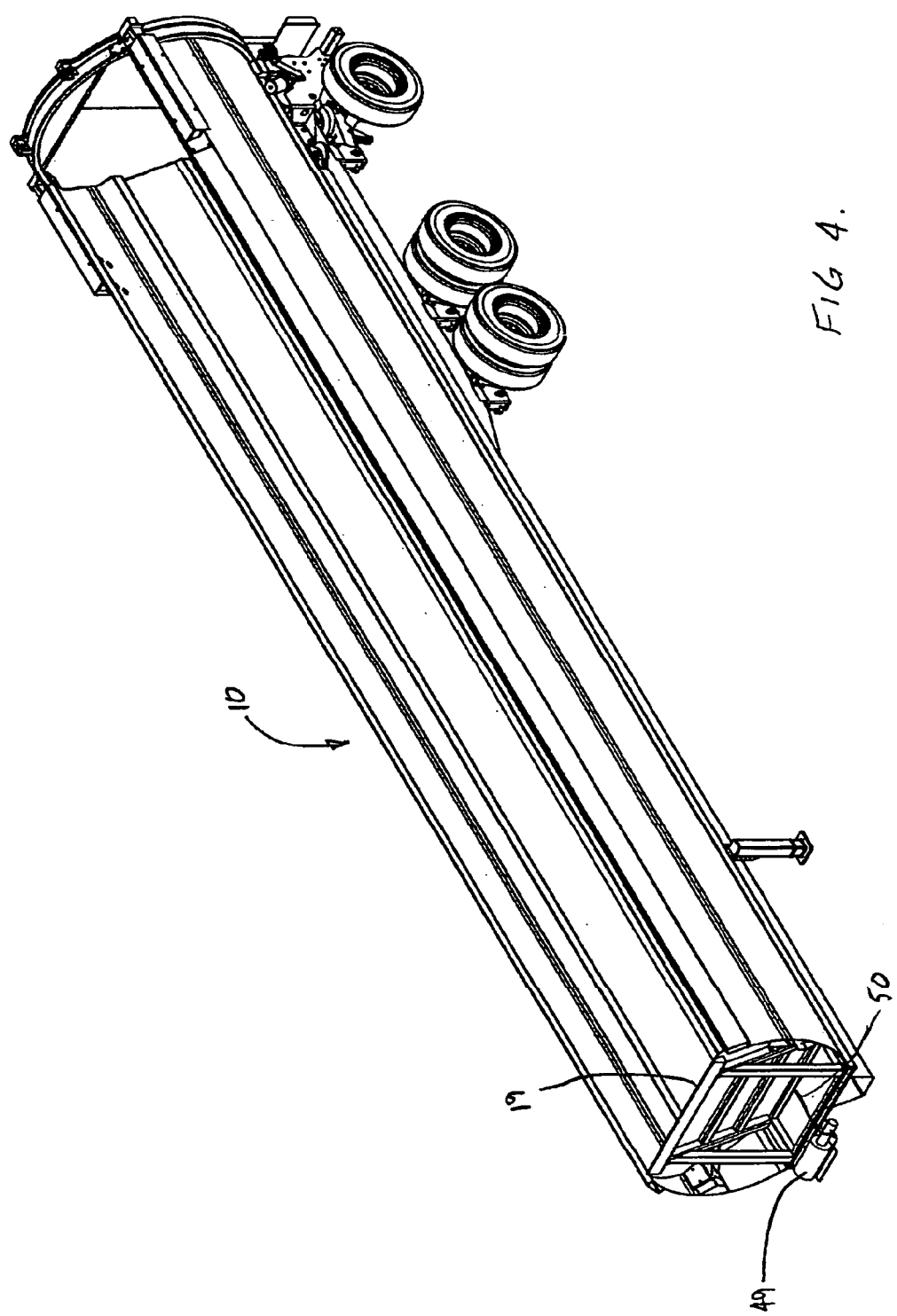
FIG. 4 is an isometric view of the trailer with the nose cone removed.
Figure 5:
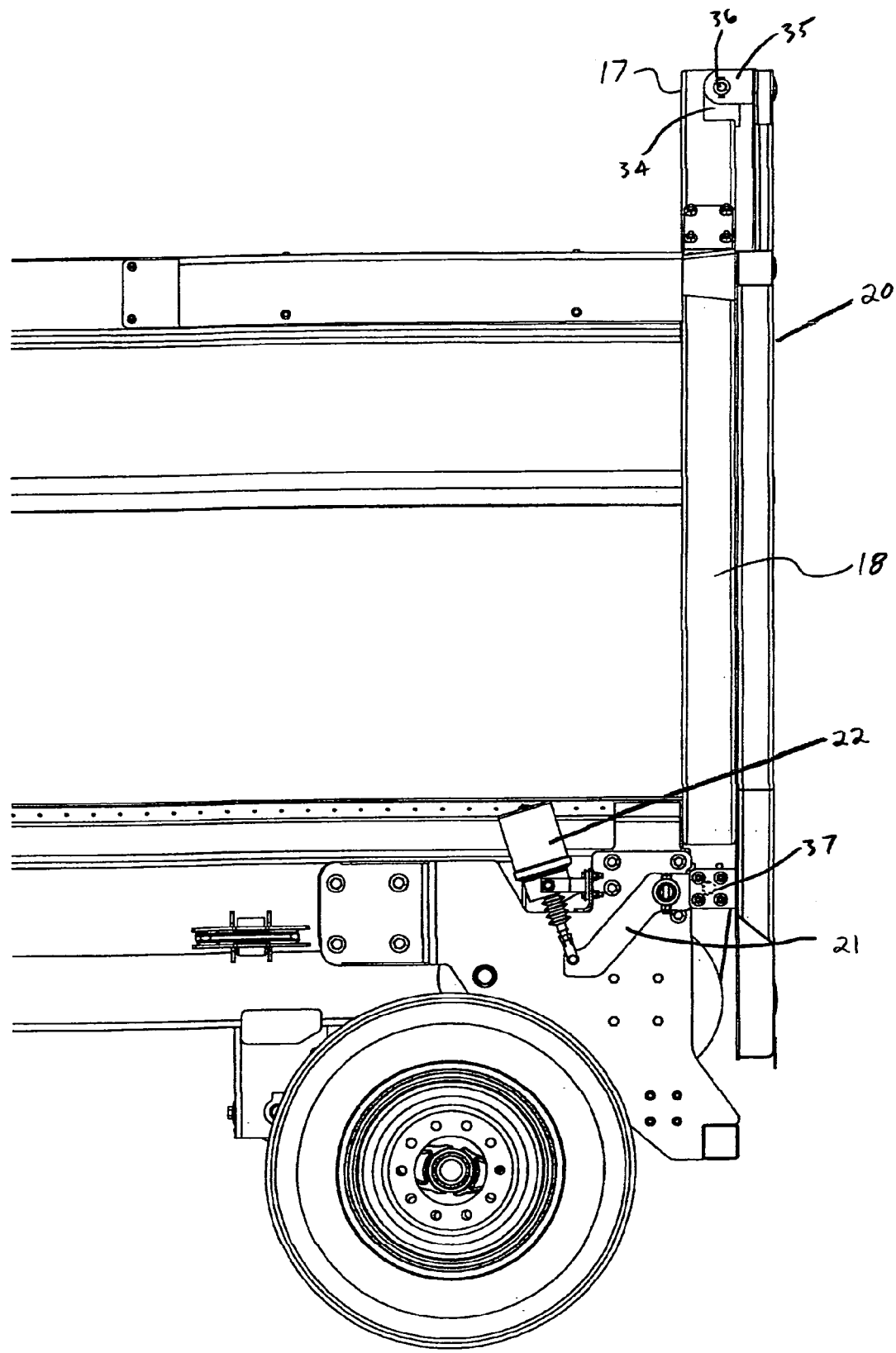
FIG. 5 is a close up side view of the rear of the trailer.
Figure 9:
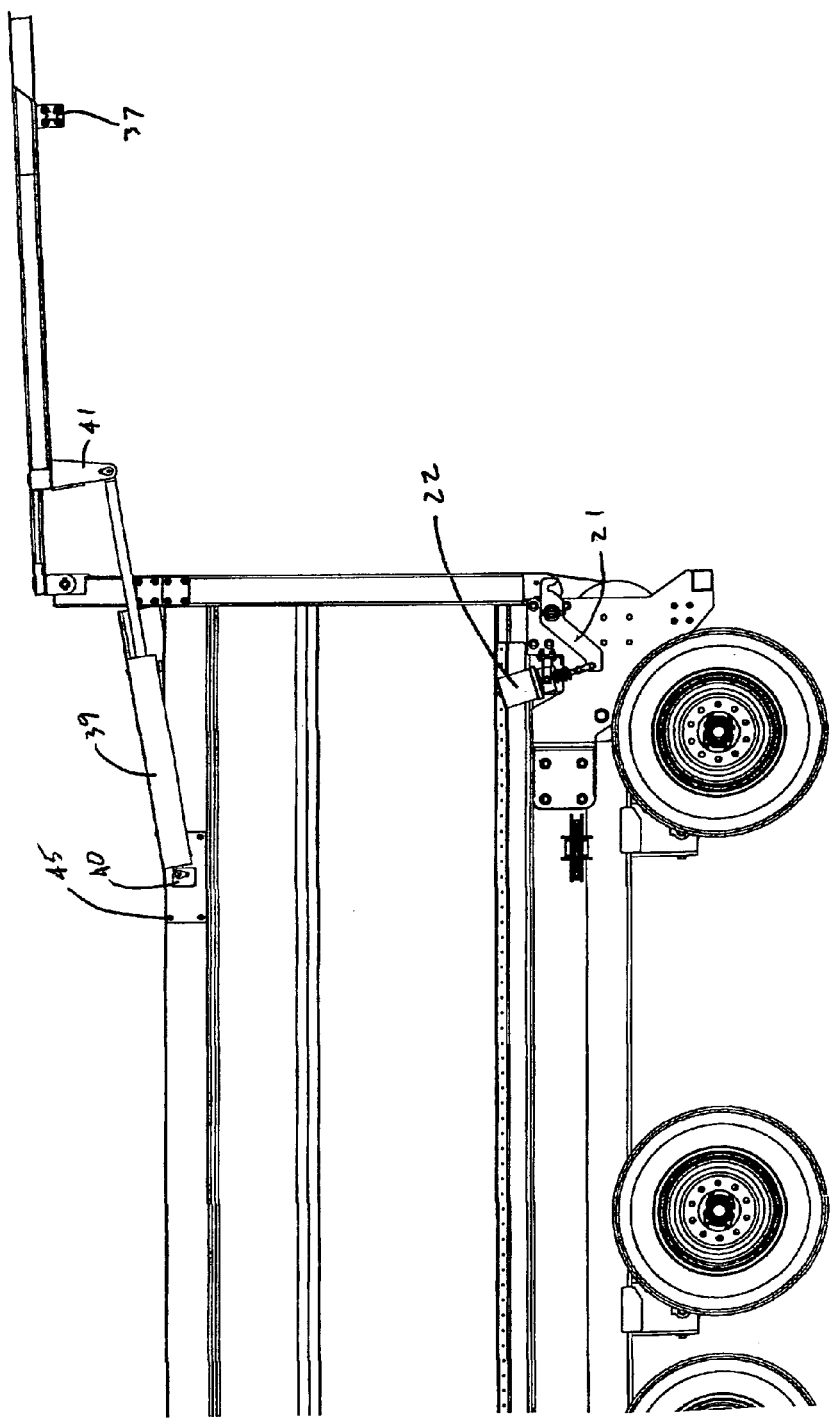
FIG. 9 is a partial elevation view showing the tailgate in the raised position.

FIG. 4 shows an ejector panel 19 at the front of the trailer 2. The ejector panel 19 closes off the front of the trailer 10. The ejector panel 19 may ride in channels (not shown) in the sidewalls 14 or floor 12. Alternately, the ejector panel 19 may simply ride on the floor 12. The rear of the trailer is closed off by a tailgate 20. The roof bow 17 at the rear of the trailer may be made stronger than the other roof bows in order to better support the hinge of the tailgate 20. As shown in FIG. 5, the tailgate 20 may be pivotally attached to the rearmost roof bow 17. Ears 34 extending from the roof bow 17 in the transverse direction 11c connect to an ears 35 extending from the tailgate 20. A pin 36 pivotally joins the ears 34 and the ears 35. The tailgate 20 is held closed by hooks 21 that engage tailgate pins 37. The hooks 21 pivot about laterally 11b extending hook pins 38. The tailgate pins 37 extend laterally 11b from each side of the tailgate 20. These hooks 21 are moved from a closed position to an open position by activating an actuator 22. Actuation is accomplished in a manner well known in the art. A tailgate cylinder may be pivotally attached, as shown in FIG. 9, by pin 42 to ears 40, that connect by fasteners 45, to each top rectangular beam 30 of the top pultrusion 15. The other end of the tailgate cylinder 39 is pivotally attached to the tailgate 20 through ears 41. Once the tailgate hooks 21 are have been disengaged from the tailgate pins 37, actuating the tailgate cylinder 39 in a manner readily known in the art, pivots the tailgate 20 around pins 36 from a nearly vertical position to a nearly horizontal position.

Figure 6:
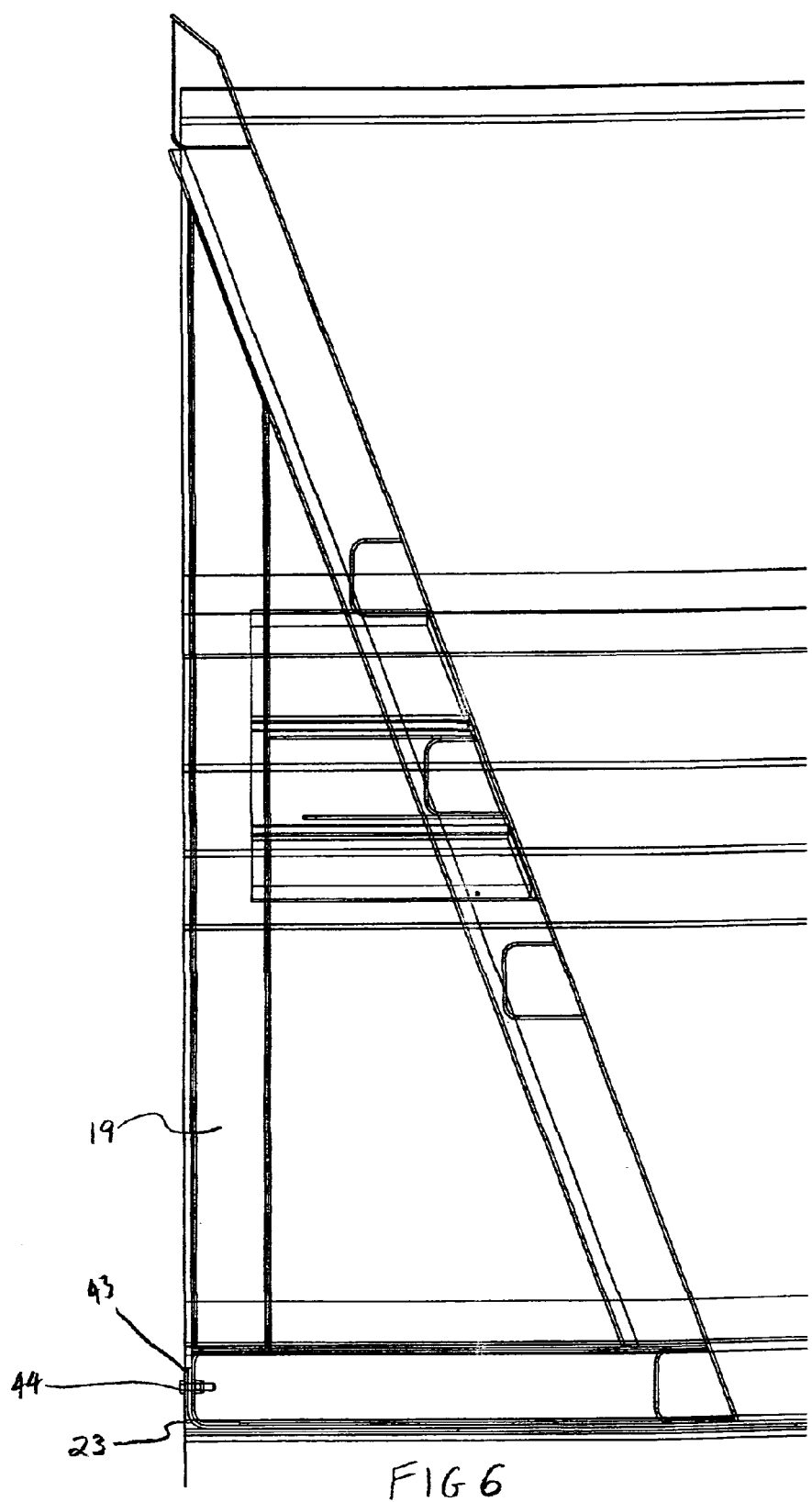
FIG. 6 is a close up side view of the front of the trailer.
Figure 7:
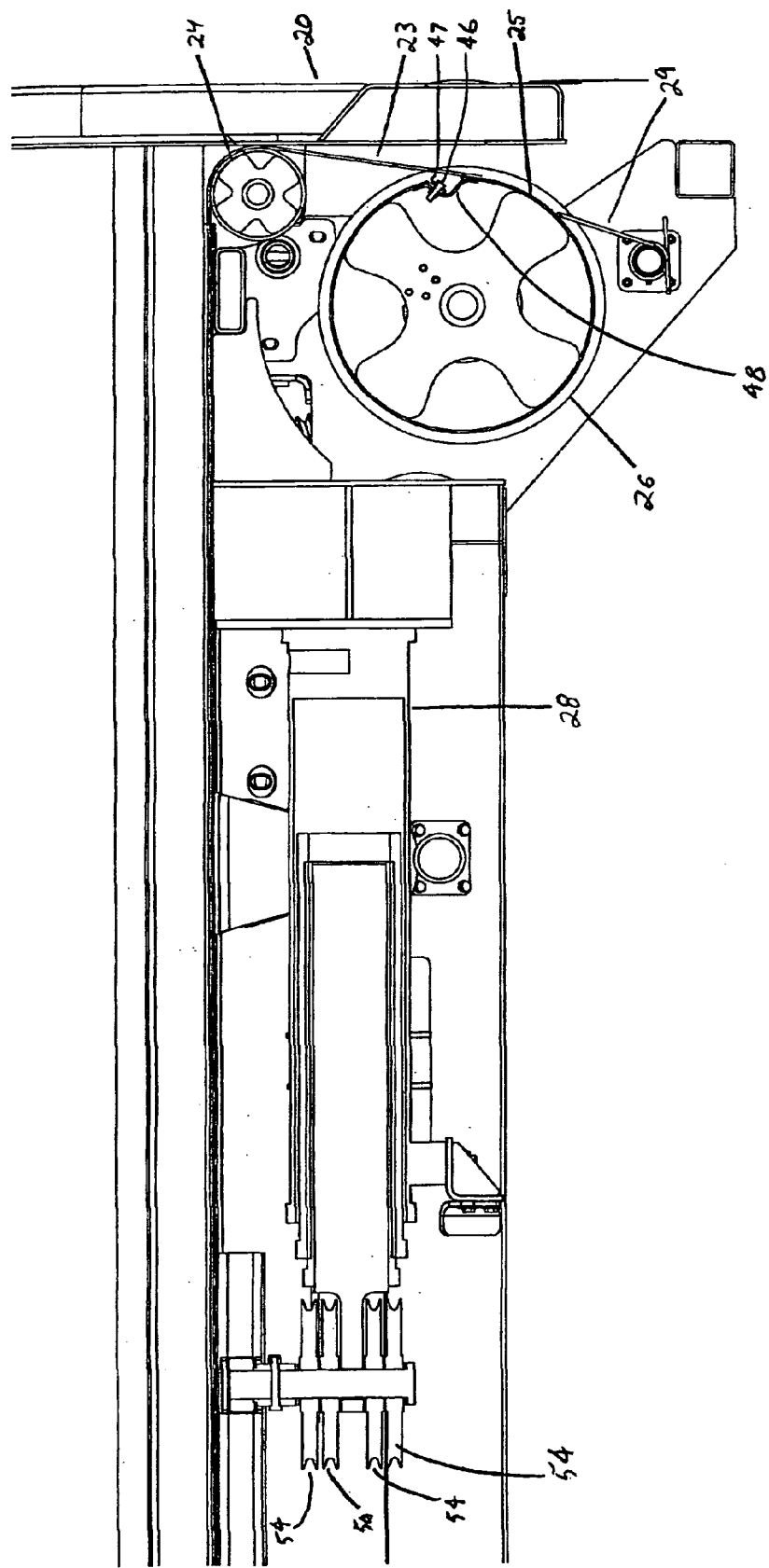
FIG. 7 is a close up of a cross sectional view taken down the centerline of the rear of the trailer.
Figure 8:
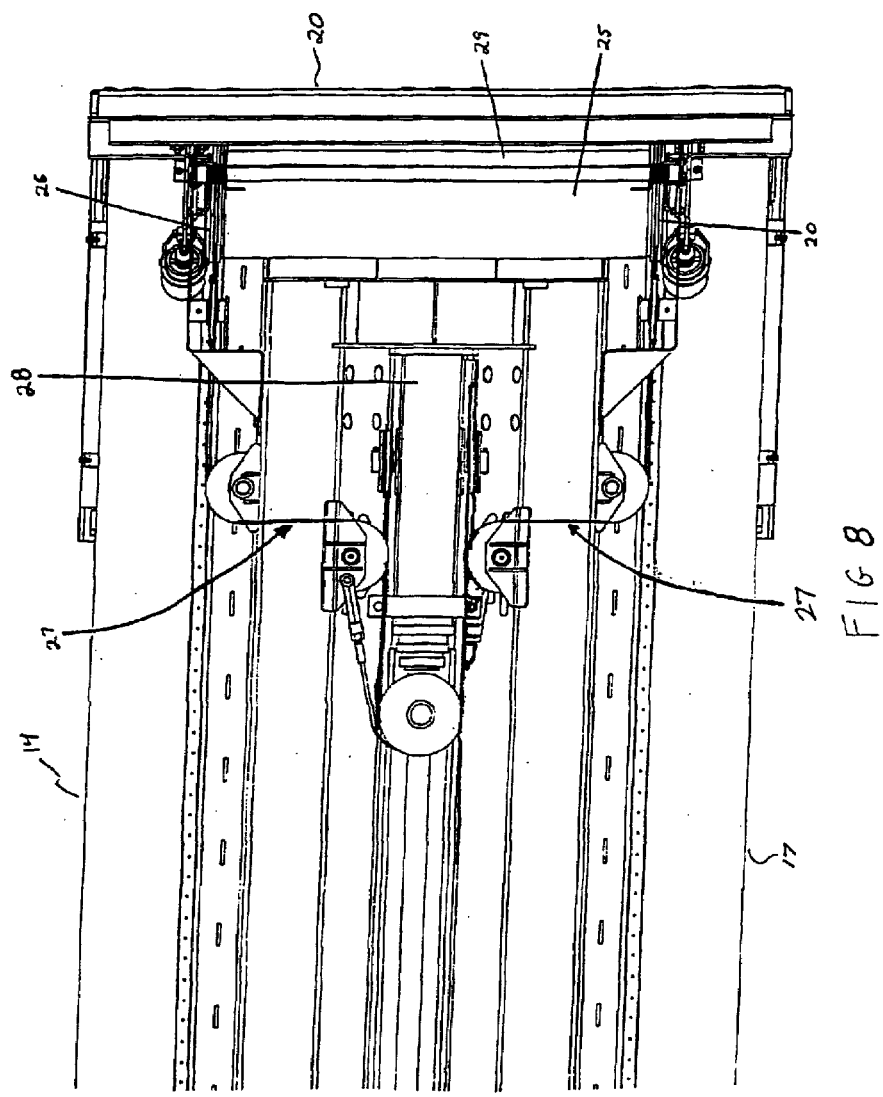
FIG. 8 is a close up view of the underside of the rear of the trailer with the suspension removed.
Figure 10:
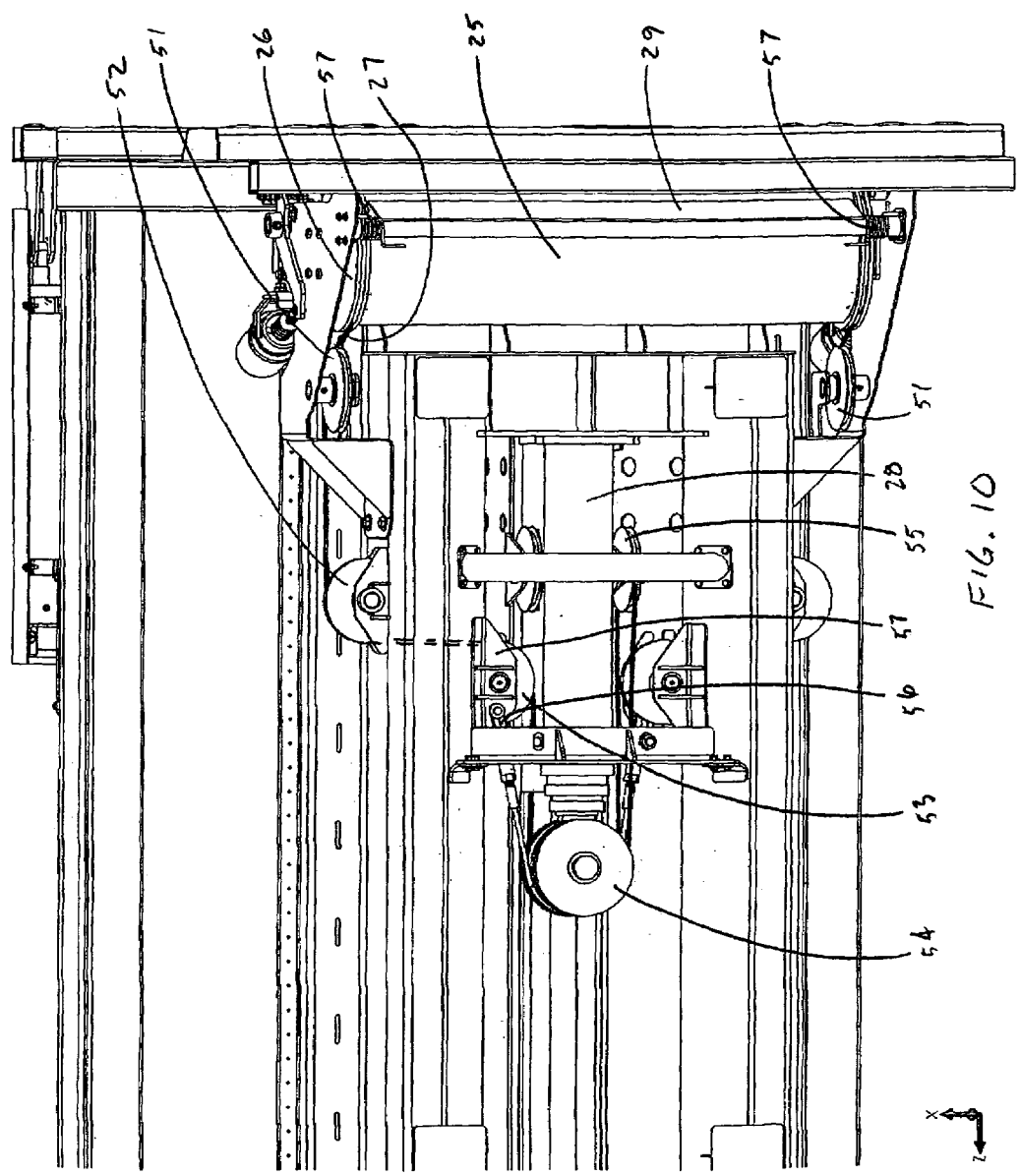
FIG. 10 is a partially rotated bottom view of the rear of the trailer.
Figure 11:
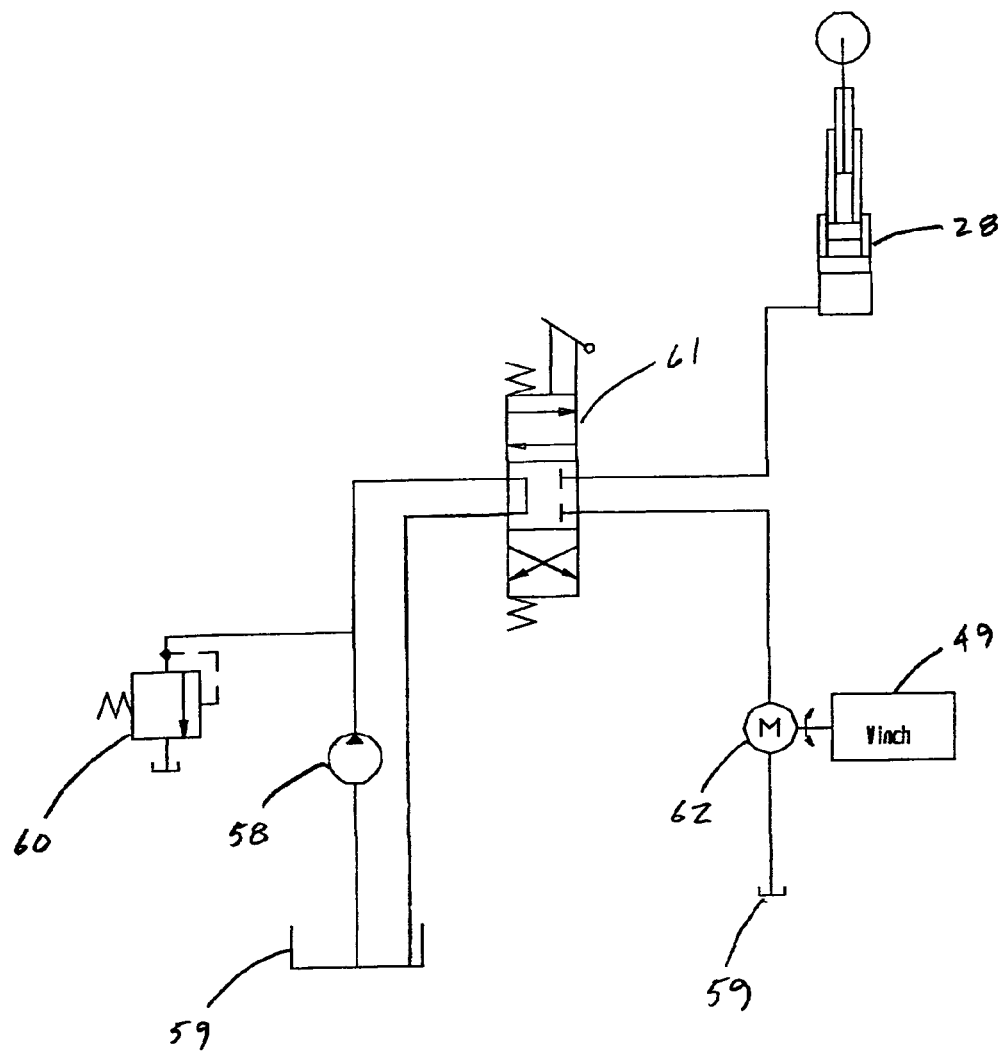
FIG. 11 is a hydraulic schematic for the trailer.

As shown in FIG. 6, a flexible material such as conveyor belting 23 is removably connected to the ejector panel 19 by use of a backing plate 43 and fasteners 44. As shown in FIG. 7, the other end of the conveyor belting 23 goes over an idler roller 24 that is mounted to the frame at the rear end of the floor and finally removably attaches to the drive roller 25 by fasteners 46 and backing plate 47. Below the idler roller 24, mounted to the frame is the drive roller 25. Trough 48 extends the length of drive roller 25 and allows the conveyor belting 23 to be attached to the drive roller 25 without causing a bulge as the conveyor belting is wound up onto the drive roller 25. To each end of the drive roller 25 is attached a cable sheave 26. The cable 27 is connected at the base of cable sheave 26 by passing a U-bolt through a slot in one side of the sheave 26 such that the legs pass over end of cable 27 and through two holes in the other side plate of cable sheave 26. Nuts are then tightened on the U-bolt holding the cable tight against the wall of the cable sheave 26. At least one cable 27 wrap on the sheave 26 assists in securing the cable 27 to the sheave 26. The cable 27 routing of the present invention is best seen in FIG. 10. There are two cables 27, each essentially a mirror image of the other. Therefore, only the routing of one cable 27 will be described in detail. A drive cable 27 is attached, as previously described, to each cable sheave 26. Each drive cable 27 is then fed over a sheave 51 that rotates on a lateral 11b axis. The cable 27 then goes over a sheave 52 that rotates around a transverse 11a axis, the cable 27 then proceeds through the support beams 13 and around another sheave 53 with a transverse 11a axis, a sheave 54 on the end of the telescopic cylinder 28, a sheave 55 attached to the frame with a lateral 11b axis, a sheave 54 on the end of the telescopic cylinder 28 and finally connects with a clevis 56 to an ear 57 that is connected to the support beams 13. A single-acting telescopic cylinder 28 is mounted at the rear end of the trailer between the two support beams with the rod facing forward. On the end of the cylinder 28 rod are four sheaves 54 to accommodate two passes of each of the two cables 27 previously described. This method of routing the cables 27 provides a four to one ratio of cable 27 movement to cylinder 28 movement.

As shown in FIG. 4, a small winch 49, that may be hydraulically operated, is mounted to the floor 12 at the front of the trailer 10. The cable 50 of the winch 49 connects to the ejector panel 19. With the ejector panel 19 moved to the front of the trailer and the tailgate 20 latched closed, the trailer is ready to receive a load. The trailer is loaded through the top. The load is contained by the conveyor belt 23 on the floor 12, the sidewalls 14, the ejector panel 19 and the tailgate 20. After loading, the load may be fully contained by rolling a tarp (not shown), as readily known in the art, over the roof bows 17 and securing the tarp to the other side. The rectangular beams of the pultrusion sidewalls 14 make an excellent place to secure the tarp. The round roof bows 17 also assure that the tarp will roll up over the load without damage. The trailer 10 is then attached to a hydraulic power source that is generally on the tractor that pulls the trailer 10. The trailer 10 is then pulled to the site where it is to be offloaded. At the offload site, the operator unlocks the hooks 21 that hold the tailgate 20 closed. This may be accomplished via a switch in the cab that shifts a valve. The valve, in turn, provides air or other fluid to an actuator 22 that moves the hooks 21. The hooks disengage pin 37, unlatching the tailgate 20. The operator then actuates a switch that similarly provides air or other fluid to the cylinders 39 that raise the tailgate 20. The operator then shifts a valve that provides hydraulic fluid and pressure to the telescopic cylinder 28. The cylinder 28 extends, it pushes the sheaves 54 attached to its rod end toward the front of the trailer. In turn, cable 27 is pulled off of the sheaves 26 at each end of the drive roller 25. The cable 27 is pulled off at a rate of four times the cylinder 28 extension rate and consequently with a force of one quarter of the cylinder 28 force. The force of cable 27 generates a torque on the drive roller 25 to wind up the floor conveyor belting 23 onto the drive roller 25. As the belting 23 winds onto the drive roller 25, the conveyor belting 23 and ejector panel 19 are pulled along the top of the floor 12 and material that was on top of the belting is deposited onto the ground. A scraper 29 on the bottom side of the drive roller 25 assures that any material that may stick to the belting 23 is scraped off before being wound onto the drive roller 25. The scraper 29 is urged against the conveyor belting 23 that is wound up on the drive roller 25 by torsion springs 57. As the conveyor belting 23 is wound onto the drive roller 25 the outer diameter becomes larger. Spring loading the scraper 29 automatically adjusts for this change. As will be clear to one skilled in the art, many other methods of spring loading the scraper could be used just as effectively without departing from the intent of the present invention.

As the belt 23 and ejector panel 19 are pulled towards the rear, cable 27 is played off of the winch 49 at the front of the trailer 10. Once the ejector panel 19 reaches the rear of the trailer 10, the load has been completely removed. An advantage of the drive system of the present invention is that the cylinder 28 comes to the end of its stroke as the panel comes to the end of its travel. Therefore, there are no limit switches or other control methods required to determine that the panel has reached the end of its travel. To return the panel 19 to its front position in the trailer 10, the small winch 49 at the front of the trailer is engaged. The cable 50 is wound onto the winch, the ejector panel 19 is dragged forward along with the conveyor belting 23 which plays off of the drive roller 25. This, in turn, winds the cables 27 onto each sheave 26 attached to the ends of the drive roller 25. As the cable 27 is wound up, the telescopic cylinder 28 is forced to retract and oil from the base end returns to the tank through the valve. This continues until the ejector panel 19 and conveyor belting 23 are completely returned to their initial position. At this point the operator actuates the switch that allows the fluid, such as air, to flow from the base end of the tailgate cylinder 39. This allows the tailgate 20 to lower. The operator can then actuate the switch to release the fluid from the actuator 22. An integral spring in actuator 22 pulls the hook closed over the tailgate pins 37 to lock the tailgate 20 in a closed position.

The present invention closely matches the available torque to the required torque during the unloading of the material contained in the trailer. Using several techniques simultaneously accomplishes this. First, as the conveyor belt 23 is wrapped on to the drive roller 25, the diameter of the drive roller 25 increases reducing the available torque and increasing the speed of ejection. Second, because the cable 27 is stacked on top of itself in the sheaves 26 attached to the drive roller 25, as cable 27 is played out, the diameter of the cable 27 in the sheave 26 decreases. This also reduces the available torque and increases the rotational speed of the drive roller 25 as the cable 27 is played out. Thirdly, the use of a multistage cylinder decreases the force on and increased the speed of the cable 27 as each smaller cylinder stage engages. This also increases the speed of ejection.

FIG. 9 shows a possible configuration for the hydraulic circuit to operate the cylinder 28 and the winch 49. A hydraulic pump 58, tank 59 and relief valve 60 would typically be installed on a tractor that would be operating a trailer 10 such as described as the present invention. A directional control valve 61 may be mounted to the trailer 10 in such a position as to be easily actuated by the operator, or alternatively may be remotely actuated electrically from the cab of the tractor. When the directional control valve 61 is actuated in one direction, flow and pressure from the pump 58 is directed to the base end of cylinder 28. Cylinder 28 extends drawing the cables 27 off of the sheaves 26 as explained in detail earlier causing the load to be ejected. At the same time, both sides of the motor 62 that controls the winch are connected to tank 59 allowing the winch 49 to freewheel. This allows the cable 50 to unwind the winch 49 as the panel 19 is drawn to the rear of the trailer 10.

When the directional control valve 61 is actuated in the other direction, flow and pressure from the pump 58 is directed to the winch 49 motor 62. This winds the cable 50 drawing the panel 19 toward the front of the trailer 10. At the same time the base end of the cylinder 28 is connected to tank. Therefore as the rod of the cylinder 28 is forced in from the panel 19 being drawn forward as previously described, fluid from the cylinder 28 is forced back to tank. This keeps tension on cables 50 and cables 27 during the return stroke of panel 19.

The chart below shows the required and actual torque as the load is being pulled out of the body. Note the steps in the available torque are the staging in the telescopic cylinder. The available torque is purposefully started considerably above the required torque to overcome the effect of the higher static coefficient of friction.

There has therefore been shown and described an ejecting trailer 10 which accomplishes at least all of its intended objectives.

We claim:

1. Wherein said drive means further comprises an hydraulic cylinder having a base end and an extending end, said hydraulic cylinder mounted below said floor of said vehicle, and at least one flexible member extending from said extending end of said hydraulic cylinder to a flexible member collection device operatively connected to said flexible floor drive roller such that extension of said hydraulic cylinder pulls said at least one flexible member off of said flexible member collection device to rotate said flexible floor drive roller to wrap said flexible floor on said flexible floor drive roller.

2. The combination of claim 1 wherein said at least one flexible member comprises a cable and said flexible member collection device comprises a cable reel.

3. The combination of claim 2 wherein said cable on said cable reel is wound thereon in an overlapping pattern with successive layers of cable wound on top of previously wound layers of cable such that as cable is pulled from said cable reel, a torque arm defined by the distance between the center axis of rotation of said cable reel and the cable being immediately pulled from said cable reel is decreasing thereby decreasing torque and generally increasing the rotational speed of said cable reel under the same drive speed from said hydraulic cylinder.

4. The combination of claim 1 wherein said hydraulic cylinder comprises a telescopic hydraulic cylinder having at least two stages.

5. The combination of claim 1 wherein said drive means further comprises an hydraulic cylinder having a base end and an extending end, said hydraulic cylinder mounted below said floor of said vehicle, said hydraulic cylinder operatively connected to said flexible floor drive roller such that extension of said hydraulic cylinder rotates said flexible floor drive roller to wrap said flexible floor on said flexible floor drive roller.

6. The combination of claim 5 wherein said hydraulic cylinder comprises a telescopic hydraulic cylinder having at least two stages.

7. The combination of claim 1 further comprising a generally upright ejector panel extending transversely and movably mounted within said body of said vehicle and connected to said forward end of said flexible floor.

8. The combination of claim 7 further comprising winch means mounted on said vehicle and operatively connected to at least one of said generally upright ejector panel and said forward end of said flexible floor, said winch means operative to move said generally upright ejector panel and said forward end of said flexible floor forwards following discharge of material from said vehicle such that said vehicle is ready for further operation.

9. The combination of claim 8 wherein said winch means is connected to at least one of said generally upright ejector panel and said forward end of said flexible floor by a return cable, said return cable being gathered onto said winch means to drag said ejector panel and said flexible floor forward to gather said at least one cable onto said at least one cable reel thereby forcing said hydraulic cylinder to retract until said ejector panel and said flexible floor are returned to their initial forwardly extended position.

10. The combination of claim 1 further comprising a tailgate mounted on said vehicle adjacent said rearward body end and an idler roller rotatably mounted adjacent said rearward body end of said vehicle and extending generally perpendicular to the longitudinal axis of said vehicle, said idler roller mounted directly below and in contact with said flexible floor, said flexible floor extending over and around said idler roller, said idler roller positioned generally below said tailgate such that closing of said tailgate over said flexible floor and said idler roller generally closes said rearward body end of said vehicle with said tailgate in contact with said flexible floor to form a seal due to the unchanging diameter of said idler roller.

* * * * *